United States Patent [19]

Spethmann

[11] 4,327,559
[45] May 4, 1982

[54] TRANSPORT AND CHILLER ENERGY MINIMIZATION FOR AIR CONDITIONING SYSTEMS

[75] Inventor: Donald H. Spethmann, Arlington Heights, Ill.

[73] Assignee: Honeywell Inc., Minneapolis, Minn.

[21] Appl. No.: 239,792

[22] Filed: Mar. 2, 1981

[51] Int. Cl.³ .......................... F25D 17/00; F24F 7/00
[52] U.S. Cl. ........................................ 62/179; 62/126; 165/16; 236/49
[58] Field of Search ...................... 165/11, 16; 236/49; 62/179, 180, 186, 126

[56] References Cited

U.S. PATENT DOCUMENTS

| | | | |
|---|---|---|---|
| 4,186,563 | 2/1980 | Schulze, Sr. ......................... | 165/11 |
| 4,245,501 | 1/1981 | Feller ................................. | 165/11 R |
| 4,267,967 | 5/1981 | Beck et al. ........................... | 236/49 |

Primary Examiner—William E. Wayner
Attorney, Agent, or Firm—Trevor B. Joike

[57] ABSTRACT

A control system for minimizing the total energy consumed by an air conditioning system of a building is disclosed having a sensor for sensing the energy expended by the fan of the air conditioning system, a sensor for sensing the energy expended by the chiller of the air conditioning system, and a controller responsive to the fan energy sensor and the chiller energy sensor for controlling the air conditioning system so that the total energy consumed by the fan and chiller systems is minimized.

22 Claims, 4 Drawing Figures

TRANSPORT AND CHILLER ENERGY MINIMIZATION FOR AIR CONDITIONING SYSTEMS

BACKGROUND OF THE INVENTION

The present invention relates to a control system for the air conditioning plants of a building and, more particularly, to a control system to minimize the energy consumed by the transport and chiller systems of a building in delivering cool air to the building zones.

Typical commercial and other large present day buildings or building complexes comprise a plurality of floors each floor having exterior zones having at least one wall exposed to the outdoors and interior zones having no walls exposed to the outdoors. A zone is defined as a room or group of rooms or an area of a floor or floors. Each floor of the building may have a plurality of fan systems for delivering treated air to the interior and exterior zones depending upon the size of the floor or floors of the building. For example, the interior zones of a building represent a cooling load both in winter and summer whereas the exterior zones of a building represent a cooling load in summer and a heating load in winter. Thus, it is typical to connect the interior zones to one fan system and the exterior zones to a second fan system. Of course, if the size of the floor is sufficient, the interior and exterior zones may each be supplied by more than one fan system.

There have been a number of efforts to minimize the energy consumed by the air conditioning systems of a building. For example, the prior art has devised load cycling systems for cycling on and off fans, radiators and other energy consuming equipment in air conditioning systems, outdoor air damper control systems for most effectively utilizing outdoor air, load shedding when energy consumption in the building approaches a peak limit, and the like. All of these prior art systems have substantially reduced the energy consumed by present day buildings.

The present invention increases these energy savings by recognizing that there is a tradeoff between the amount of energy required to transport cooled air to the building zones and the amount of energy consumed by the chiller in chilling the water supplied to the cooling coils of the fan systems to a sufficient degree to satisfy the needs of the zones connected to the fan system. The transport energy may be defined simply as the energy required by the fan system to deliver cool air to the zones or may be defined as a combination of the fan energy plus the pump energy expended by the pump associated with the chiller in supplying chilled water from the chiller to the cooling coils of the fan systems. Thus, at a particular building load it may be cheaper to use more fan rather than more chiller whereas at a different load it may be cheaper to use more chiller and less fan. These savings cannot be recognized by those systems which merely select a chilled water supply temperature and adjust a fan accordingly. According to the present invention, savings can be increased by selecting a chilled water supply temperature and a cooperating fan speed which will satisfy the zone conditions at a minimum expenditure of energy.

SUMMARY OF THE INVENTION

These savings are realized by providing an air conditioning control system having a fan energy sensor for sensing the energy expended by a fan in transporting treated air through a duct, a chiller energy sensor for sensing the energy expended by the chiller the building, and a controller responsive to the sensors for controlling the air conditioning system in such a fashion as to minimize the total energy consumed by the transport and chiller systems of the building.

BRIEF DESCRIPTION OF THE DRAWINGS

These and other features and advantages will become more apparent from a detailed consideration of the invention when taken in conjunction with the drawings in which.

DETAILED DESCRIPTION

Typical air conditioning systems in buildings comprise the ducts running throughout each floor in the building for the supply of air to the zones. Air is driven through the ducts, from both return air ducts returning air from the zones and from outdoor air ducts bringing in fresh air, by a fan which drives the air over various heat exchange coils. These heat exchange coils usually take two forms, either a cooling coil supplied with a cooling fluid such as water cooled by a chiller or a heating coil supplied with hot water from a boiler or furnace. The air is then supplied to other ducts which have dampers located therein operated by thermostats located in the zone supplied by the duct to regulate the temperature within a zone. The fan system may have a static pressure sensor for sensing the static pressure in the main supply duct so that as the zone dampers are being regulated to control the temperatures of their associated zones, the fan can be adjusted for supplying only the requisite amount of air instead of wasting energy by operating the fan system at its maximum capacity continuously. Thus, when controlling an air conditioning system to operate efficiently, not only should the energy supplied to the chiller be taken into account, but also the energy supplied to the fan.

Figure 1:
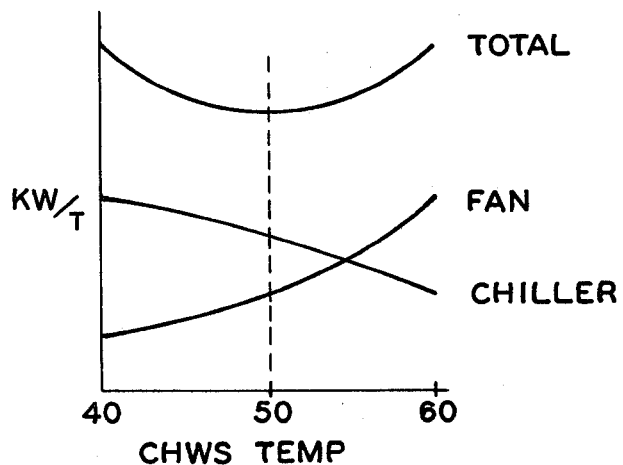
FIG. 1 is a graph of the kilowatt per ton versus chilled water supply temperature of the fan, of the chiller, and the total of the fan and the chiller in a typical system.

The graph shown in FIG. 1 shows typical fan and chiller curves. The amount of energy per ton for the chiller and fan have been charted as a function of chilled water supply temperature. It should be realized that, for a given load in a typical air conditioning system, either the chilled water supply temperature of the chiller supplied water can be decreased for allowing the supply air temperature to decrease which causes the amount of air supplied by a fan to decrease or the chilled water supply temperature can be increased which raises the supplied air temperature for causing the amount of air supplied by the fan to be increased to maintain desired conditions. Thus there is a trade off between fan and chiller energy to satisfy any given load. The fan curve and the chiller curve have been added together and is represented by the total energy curve which shows that at any given load condition there is a chilled water supply temperature which results in a minimum total energy expenditure between fan and chiller systems to satisfy the needs of the building. The graph of FIG. 1 is shown for a load condition at which a chilled water supply temperature of 50° results in a minimum total energy expenditure. However, as the load on the building changes, the chilled water supply temperature which results in this lowest total energy expenditure will also change.

Figure 2:
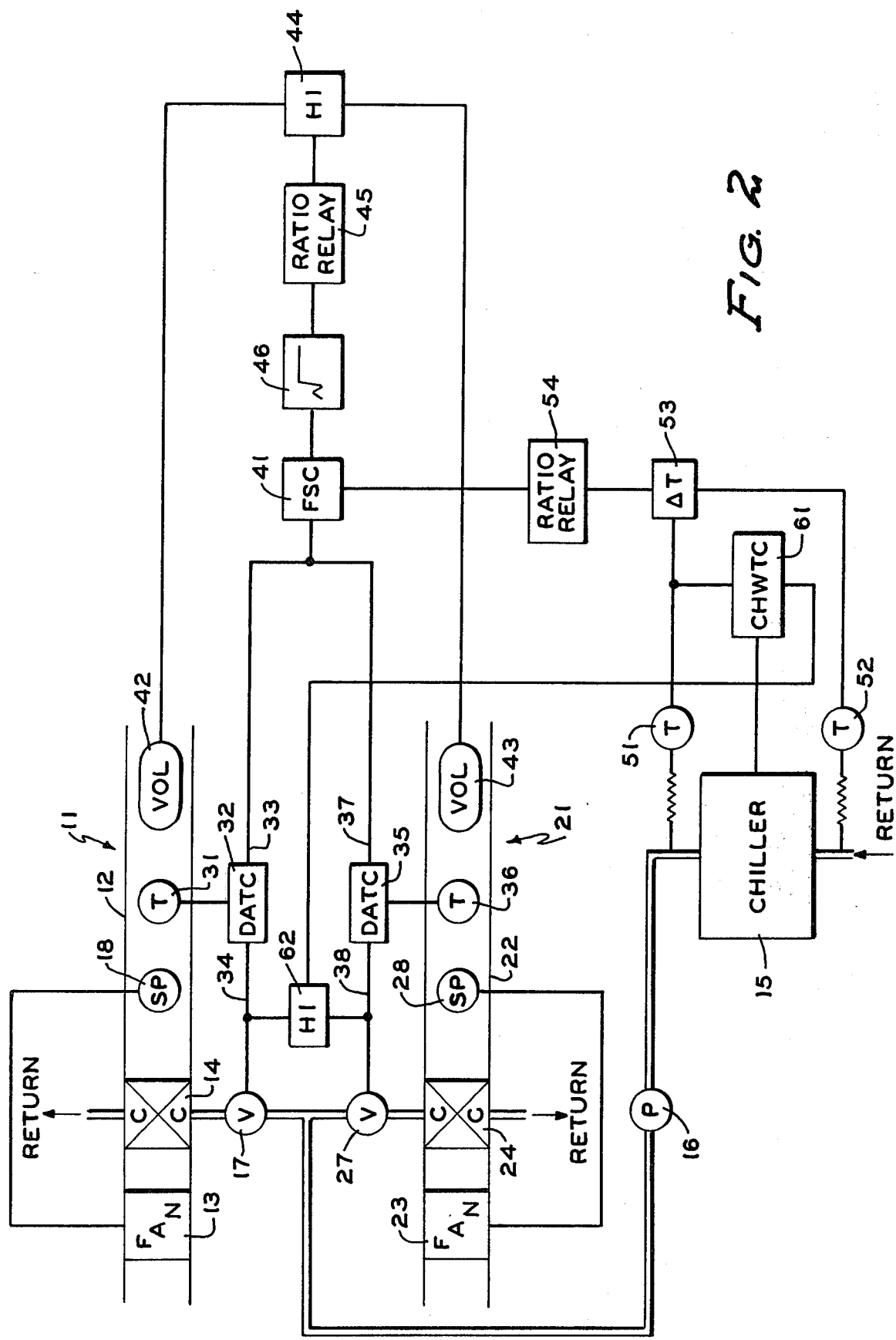
FIG. 2 shows one system for minimizing the transport and chiller system energy consumption in a typical building air conditioning system.

FIG. 2 shows one type of system which may take into account the advantages demonstrated by FIG. 1. In FIG. 2, fan system 11 comprises duct 12 for the supply of treated or conditioned air to one or more zones. Fan system 11 includes fan 13 and cooling coil 14 located within duct 12. Cooling coil 14 is supplied with chilled water by pump 16 from chiller 15 with the amount controlled by valve 17. A second fan system 21 includes duct 22 in which is located fan 23 and cooling coil 24. Cooling coil 24 is supplied with chilled water by pump 16 from chiller 15 with the amount controlled by valve 27. Chilled water exiting cooling coils 14 and 24 is returned to the input side of chiller 15. As mentioned previously, a fan system within a building may be used to supply a plurality of smaller ducts each having a damper located therein. Each damper in these smaller ducts is controlled by a corresponding thermostat in the zone supplied with air by the smaller duct. As the temperature within the zones changes, the thermostats change the positions of the dampers which affects the static pressure within the fan system. Thus, fan system 11 has static pressure sensor 18 therein for controlling fan 13 so that fan 13 supplies only the necessary amount of air to the smaller ducts which may be connected to main supply duct 12. Likewise, fan system 21 has static pressure sensor 28 located therein for controlling fan 23 so that fan 23 need only supply the necessary amount of air to satisfy the smaller ducts which may be connected to main supply duct 22.

In order to minimize the total transport and chiller energy requirements of the air conditioning system, it is preferable to measure transport energy and chiller energy. One way to derive a representation of fan energy is to sense the volume of air supplied by the fan. That is, the higher the volume of air moved by the fan, the greater the fan energy requirement. Moreover, a chiller requires increased energy to increase refrigerant head. Thus, fan energy can be indirectly sensed by a volume sensor and chiller energy can be indirectly sensed by temperature sensors for sensing refrigerant head. Accordingly, volume sensor 42 senses the volume of air moved through duct 12 by fan 13. Volume sensor 43 senses the volume of air moved through duct 22 by fan 23. And, temperature sensors 51 and 52 together with difference element 53 senses the refrigerant head across chiller 15.

The control means utilizes these sensors for then minimizing transport and chiller energy. In order to control valve 17 and thus control the amount of cooling supplied by cooling coil 14, thermostat 31 is located within duct 12 and provides an input to discharge air temperature controller 32 which receives a setpoint input at 33. Discharge air temperature controller 32 compares the signal received from thermostat 31 to the setpoint established at input 33 and provides an output at 34 for controlling valve 17. Likewise, the temperature of the air supplied by duct 22 is controlled by valve 27 which receives an input from discharge air temperature controller 35 which receives an input from thermostat 36 to be compared to a setpoint at input 37.

Discharge air temperature controller 35 then provides an output at 38 to control valve 27. Each of the discharge air temperature controllers 32 and 35 may be a Honeywell RP908A.

Volume sensor 42 and volume sensor 43 are connected to high pressure selector 44 which supplies the highest of its input pressures to ratio relay 45. Ratio relay 45 may be a Honeywell RP971 to convert the high pressure signal into a 3–13 psi output having a selected relationship (ratio) to the input signal. Because the output from ratio relay 45 is a non-linear function, it is supplied through square root extractor 46 and then operates as one input to fan system controller 41. Such a square root extractor may be shown in U.S. Pat. No. 4,201,336.

The other input to fan system controller 41, which may be a Honeywell RP908B, is derived from the refrigerant head sensing system. Temperature sensor 51 senses the temperature of the chilled water supply in the pipe leading to pump 16. Temperature sensor 52 senses the temperature of the water being returned to chiller 15. Together, the difference between the temperature sensed by sensors 51 and 52 represent the refrigerant head of chiller 15. This difference is provided by element 53 which may be any suitable element for supplying a pneumatic pressure proportional to the difference between the outputs from sensors 51 and 52. The output from element 53 is supplied through another ratio relay 54 and forms the second input to fan system controller 41.

The output from fan system controller 41 then provides the setpoint inputs 33 and 37 to corresponding discharge air temperature controllers 32 and 35. This control system essentially uses the fan system having the greatest amount of air moving through it as representative of the entire fan system of the building. Fan system controller 41 will thus in effect compare the energy required by this representative fan system to the amount of energy required by the chiller and control both the fan system and the chiller at a point where the slopes of their response curves are equal but opposite thus resulting in the lowest total energy expenditure of the combined fan and chiller systems to maintain the conditions of the building.

The temperature of the chilled water exiting chiller 15 and supplied to valves 17 and 27 by pump 16 is controlled by chilled water temperature controller 61 which receives an input from temperature sensor 51 and which receives another input from high pressure selector 62. High pressure selector 62 selects the higher of the pressures in lines 34 and 38.

In order to understand how the control of valves 17 and 27 results in minimizing total energy, the entire air conditioning system must be considered. If there is an increase in the load to a zone of the building, the thermostat within the zone will respond by causing the damper regulating the amount of air supplied to that zone to open more for supplying more air to the zone. The static pressure sensor located in the fan system of the main duct supplying air to that zone, such as static pressure sensor 18 of fan system 11, will sense a decrease in the static pressure and will control fan 13 to increase the volume of air moved by fan 13 through duct 12. Volume sensor 42 will thus provide an increasing output signal based upon the increased volume of air moving through duct 12 which, if it is the highest of the signals connected to high pressure selector 44, will operate through ratio relay 45, square root extractor 46, and fan system controller 41 for adjusting the setpoint 33 to discharge air temperature controller 32 for opening valve 17 in an increasing manner to supply more cold water to cooling coil 14. Thus, the air moving through duct 12 will have a lower temperature. At the same time, if the branch line pressure supplied by discharge air temperature controller 32 to valve 17 is or becomes the higher of the pressure supplied to high pressure selector 62, the output of high pressure selector 62 will increase to adjust the setpoint input to chilled water temperature controller 61 for supplying an output to control the inlet vane of centrifugal chiller 15 in such a manner as to reduce the chilled water temperature of the water supplied by pump 16 to the cooling coils of the fan systems. As both the amount of water supplied to cooling coil 14 increases and the temperature of that water decreases, the air exiting cooling coil 14 will be colder. The thermostat located in the zone which experienced the load change will then receive more air at a lower temperature. As it becomes satisfied, it begins driving its damper in a closing manner which then increases the static pressure in duct 12 and static pressure sensor 18 will then cause fan 13 to slow down. Thus, a balance is reached between the amount of air delivered by fan 13 and the temperature of the chilled water supply which balance will result in the lowest total energy input into the system to maintain desired conditions. Ratio relays 45 and 54 and fan system controller 41 are thus arranged to insure that the fan and chiller are operated along their curves at a point wherein their slopes are equal but opposite.

Figure 3:
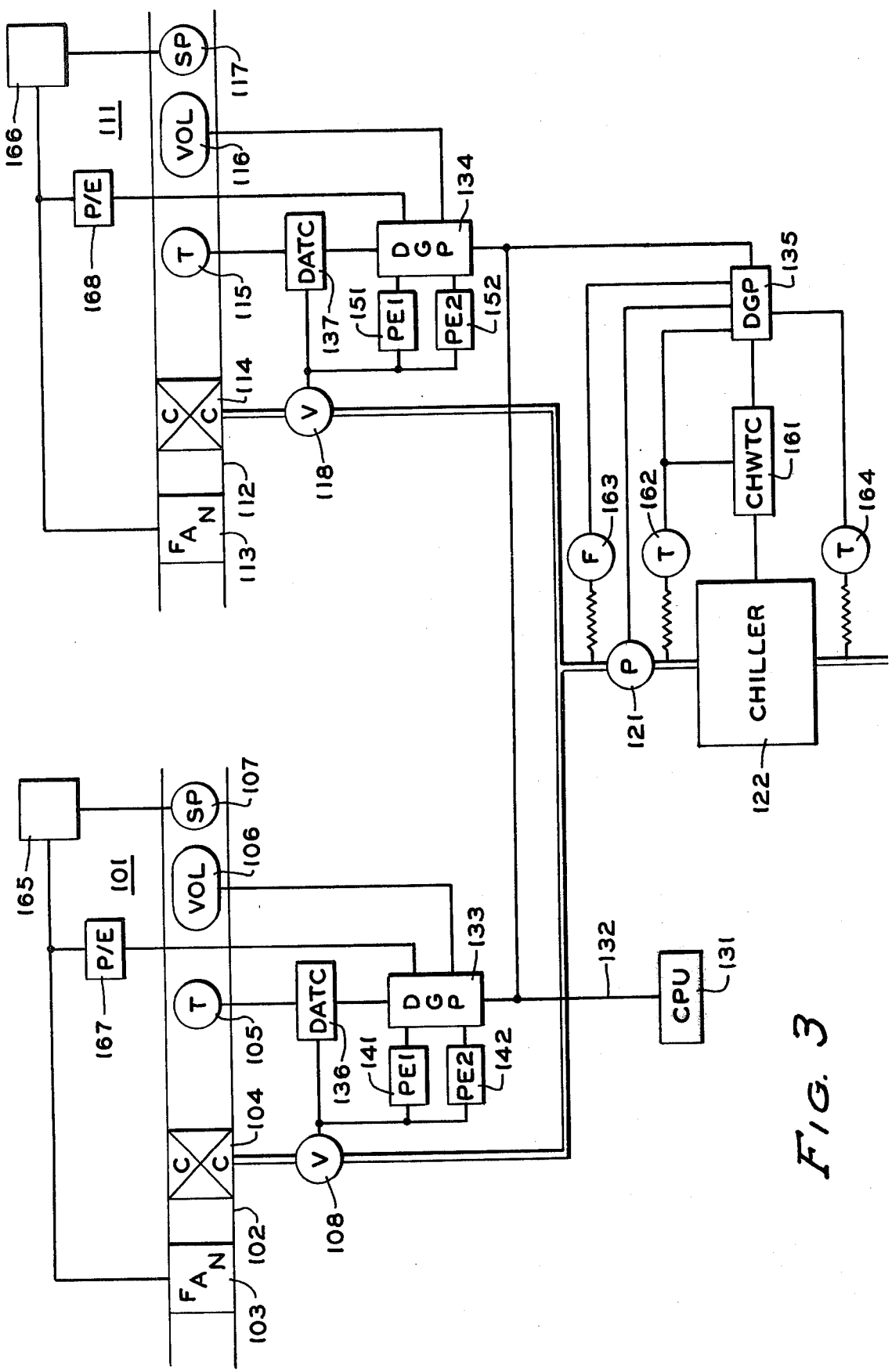
FIG. 3 shows another form for minimizing the transport and chiller system energy consumption; and, FIG. 4 shows a flow chart for the CPU shown in FIG. 3.

The circuit shown in FIG. 3 is an alternative arrangement to that shown in FIG. 2. The system shown in FIG. 2 is concerned only with the energy required by the fans and the chiller to maintain building conditions. The system of FIG. 3 also recognizes that the pump for supplying chilled water to the cooling coils from the chiller also requires energy. The system shown in FIG. 3 takes into account the total transport energy, i.e. the energy required by the fans to deliver conditioned air to the zones, and the energy required for the pump to deliver chilled water to the cooling coils.

In FIG. 3, fan system 101 includes main duct 102 in which fan 103 and cooling coil 104 are located. Also located within duct 102 are thermostat 105, volume sensor 106 and static pressure sensor 107. Fan system 111 includes duct 112 in which are located fan 113 and cooling coil 114. Also located within duct 112 are thermostat 115, volume sensor 116 and static pressure 117. Cooling coil 104 is supplied with chilled water through valve 108 and cooling coil 114 is supplied with chilled water through valve 118. Both valves are supplied with water by pump 121 which derives its supply of chilled water from chiller 122.

The control system for controlling the air conditioning system is centered around central processing unit 131 which may be, for example, part of one of the Delta systems manufactured by Honeywell. CPU 131 is connected by communication bus 132 to data gathering panel 133 which controls fan system 101 and to data gathering panel 134 which controls fan system 111. CPU 131 is also connected over communication bus 132 to data gathering panel 135 which controls the chiller system.

Data gathering panel 133 has inputs from volume sensor 106 and static pressure sensor 107 and has outputs for controlling discharge air temperature controller 136 and fan 103. Data gathering panel 134 has inputs from volume sensor 116 and static pressure 117 as well as outputs to discharge air temperature controller 137 and to fan 113. Additionally, thermostats 105 and 115 may also be connected to data gathering panel 133 and 134 respectively so that CPU 131 can read the discharge air temperatures within ducts 102 and 112.

In order for CPU 131 to determine which zone has the greatest demand, pressure-to-electric switches 141 and 142 are connected to the output of discharge air temperature controller 136 and are set to switch at different pressures to provide inputs to data gathering panel 133. For example, P/E switch 141 may be set at a pressure representing a full open condition of valve 108 and P/E switch 142 may be set for a slightly less open valve condition. Likewise, P/E switches 151 and 152 may be similarly arranged.

In the chiller system, the temperature of the chilled water is controlled by chilled water temperature controller 161 which has a setpoint input from data gathering panel 135 and a feedback input from thermostat 162 located to sense the temperature of the water leaving chiller 122. Flow sensor 163 is located to sense the flow at the output of pump 121 and thermostat 164 is located to sense the temperature of the water being returned to chiller 122. By utilizing thermostats 162 and 164, the refrigerant head of chiller 122 may be determined. By using flow sensor 163, the transport energy of the pump 121 may be determined. By utilizing flow sensors 106 and 116, the amount of air and thus the transport energy represented by fans 103 and 113 may be determined. Data gathering panels 133, 134 and 135 are also part of the Delta systems and the discharge air temperature controllers 136 and 137 and the chilled water temperature controller 161 may be substantially the same as those shown in FIG. 2.

Figure 4:
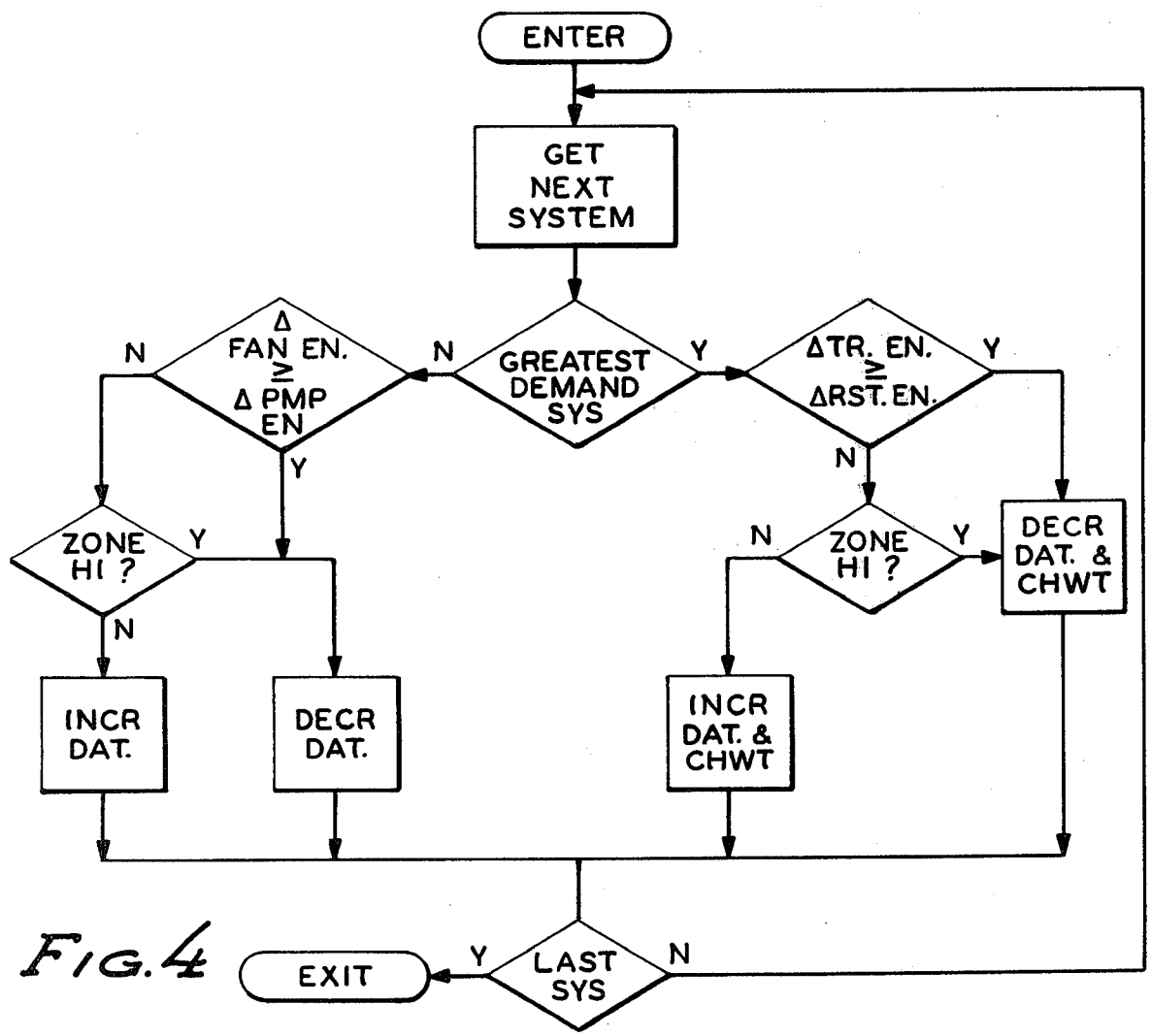

The operation of the system shown in FIG. 3 may be understood with respect to FIG. 4. If a zone located within a building experiences a load change, its thermostat will modulate the damper controlling the supply of air to that zone. Thus, one of the static pressure sensors located in one of the fan systems will experience a change in static pressure. This static pressure is maintained by controllers 165 or 166 for changing fan capacity. The volume of air moving through the duct will change and is sensed by the central processing unit through the associated data gathering panel and sensor 106 or 116. Alternatively, fan capacity can be indicated by control signals from controllers 165 or 166 which are transmitted to the CPU's through pneumatic-to-electric switches 167 or 168 and DGPs 133 or 134. When the routine represented by the flow chart shown in FIG. 4 is entered, central processing unit 131 will run through its series of operations for the first fan system. Its first decision is to determine whether or not the selected fan system is the greatest demand system. The central processing unit will know whether or not this system is the greatest demand system by monitoring the action of the pressure-to-electric switches through the data gathering panel. If this fan system is the greatest demand fan system, then it is most efficient to reset the chilled water temperature upward to a point where the valve controlling the supply of chilled water to the cooling coil in that fan system is wide open and to modulate back all of the other valves in all of the other fan systems. However, the chilled water supply temperature should not be set higher than a temperature which will result in an equal but opposite slope between the energy required by the chiller to chill the water and the transport energy which for this fan system is defined as the energy required by the fan to deliver air to the zones to which the fan system is attached and the energy required by the pump to supply chilled water to the cooling coils located in the fan systems.

Thus, if the selected fan system is the greatest demand fan system, then the CPU will assume an incremental change of, for example, 1° in chilled water supply temperature in a direction to satisfy a load change. Thus, assuming an incremental change of 1°, CPU 131 determines whether or not the resulting incremental change in transport energy is greater than or equal to the resulting incremental change in chiller energy. It the incremental change in transport energy is greater than or equal to the incremental change in reset (chiller) energy, then the chilled water temperature is decreased (reset) thus requiring more chiller energy and less fan energy. If the incremental transport energy is not greater than or equal to the incremental chiller energy, then a decision is made whether or not the temperature of the zone experiencing the load change is above or below the upper edge of the comfort range established for that zone. The comfort range is a range of temperatures such that, if the actual temperature is within the range, typically no change in heating or cooling is made. In the present system, however, if the temperature in the zone is above comfort range, then the chilled water temperature is decreased so that the air supplied to that zone can be made colder. If the temperature is within the comfort range then the chilled water temperature is increased. The upper edge of this range, therefore, represents the temperature requiring the lowest energy input to the chiller to still maintain the temperature within the range. Thus, the chilled water temperature is continually being either increased or decreased around the lower of two points, one which represents equal but opposite slopes between transport energy and chiller energy or one which just satisfies comfort zone needs.

In any event, if this system is not the last system to be monitored by CPU 131, the next system is obtained. For systems other than the greatest demand systems, the CPU determines what effect a 1° change in chilled water supply temperature in a direction determined by the load change will have on the system. Thus, a determination must be made whether or not the resulting incremental change in fan energy is greater than or equal to the resulting incremental change in pump energy. Specifically, a determination is made whether or not the fan should change its speed to deliver a modulated amount of air or if the condition can be satisfied merely by changing the amount of water supplied by valve 108 to cooling coil 104. Less water allowed to flow through valve 108 requires less energy by pump 121 to deliver that water. Again, it is desirable to control fan 103 and pump 121 at a point to minimize the total transport energy of fan and pump in attempting to meet zone conditions. Thus, if the incremental change in fan energy is greater than or equal to the incremental change in pump energy, the discharge air temperature is lowered causing the valve to supply more chilled water to cooling coil 104 through valve 108. This will require less air flow and fan energy and thus the total transport energy is lowered. If the incremental change in fan energy is not greater than or equal to the incremental change in pump energy, than again it is determined whether or not the zone temperature is within or above the comfort range. If the zone temperature is above the comfort range, again the discharge air temperature is lowered in an attempt to bring the temperature back within the comfort range. If the temperature is within the comfort range, then the discharge air temperature is increased causing reduced water flow through the valve to the cooling coil and reduced pumping energy and requiring an increase in air flow and fan energy, but reducing the total transport energy.

Once the last system has been adjusted in this manner, the system exits and awaits the time when it again periodically enters.

The embodiments of the invention in which an exclusive property or right is claimed are defined as follows:

1. A control system for minimizing the total energy consumed by the transport system and chiller of a building's air conditioning system, said air conditioning system comprising at least one fan system having a cooling coil supplied by the chiller and a fan for transporting treated air through a duct, said control system comprising:

transport energy sensing means for sensing the energy expended in transporting said treated air through said duct;

chiller energy sensing means for sensing the energy expended by said chiller; and, control means responsive to said transport energy sensing means and said chiller energy sensing means and adapted to be connected to said air conditioning system for minimizing the total energy consumed by said transport system and said chiller.

2. The system of claim 1 wherein said transport energy sensing means comprises volume sensing means for sensing the amount of air delivered by the fan system.

3. The control system of claim 2 wherein said chiller energy sensing means comprises refrigerant head sensing means for sensing the refrigerant head of the chiller.

4. The control system of claim 3 wherein said control means comprises a discharge air temperature controller having a first input connected to a temperature sensor for sensing the temperature of the air being delivered through the duct, a second input for establishing the temperature of the air moving through the duct, and an output for controlling the amount of chilled water supplied to the cooling coil.

5. The control system of claim 4 wherein said control means comprises a chilled water temperature controller having a first input connected to a temperature sensor for sensing the temperature of the water supplied by the chiller, a second input for determining the temperature of the water, and an output connected to the chiller.

6. The control system of claim 5 wherein said control means comprises fan system control means having a first input derived from said refrigerant head sensing means and a second input derived from said volume sensing means and having an output connected to the second input of said discharge air temperature controller to minimize the total transport and chiller energy usage.

7. The control system of claim 5 comprising a computer system connected to said discharge air temperature controller and to said chilled water temperature controller for controlling said fan and chiller to minimize the transport and chiller energy usage.

8. The control system of claim 1 wherein said control means comprises a discharge air temperature controller having a first input connected to a temperature sensor for sensing the temperature of the air being delivered through the duct, a second input for establishing the temperature of the air moving through the duct, and an output for controlling the amount of chilled water supplied to the cooling coil.

9. The control system of claim 8 wherein said control means comprises a chilled water temperature controller having a first input connected to a temperature sensor for sensing the temperature of the water supplied by the chiller, a second input for determining the temperature of the water, and an output connected to the chiller.

10. The control system of claim 9 wherein said control means comprises fan system control means having a first input derived from said chiller energy sensing means and a second input derived from said transport energy sensing means and having an output connected to the second input of said discharge air temperature controller to minimize the total transport and chiller energy usage.

11. The control system of claim 9 comprising a computer system connected to said discharge air temperature controller and to said chilled water temperature controller for controlling said fan and chiller to minimize the transport and chiller energy usage.

12. A control system for minimizing the total energy consumed by the transport system and chiller of a building's air conditioning system, said air conditioning system comprising at least first and second fan systems having corresponding first and second cooling coils supplied by the chiller and first and second fans for transporting treated air through associated ducts, said control system comprising:
- transport energy sensing means for sensing the energy expended in transporting treated air through said ducts, said transport energy sensing means including first and second fan energy sensing means for sensing the energy expended by said first and second fans respectively;
- chiller energy sensing means for sensing the energy expended by said chiller; and,
- control means responsive to said transport energy sensing means and said chiller energy sensing means and adapted to be connected to said air conditioning system for minimizing the total energy consumed by said transport system and said chiller.

13. The system of claim 12 wherein said first and second fan energy sensing means comprises respective first and second volume sensing means for sensing the amount of air delivered by said respective first and second fan systems.

14. The control system of claim 13 wherein said chiller energy sensing means comprises refrigerant head sensing means for sensing the refrigerant head of the chiller.

15. The control system of claim 14 wherein said control means comprises a first discharge air temperature controller having a first input connected to a first temperature sensor for sensing the temperature of the air being delivered by said first fan system, a second input for establishing the temperature of the air delivered by said first fan system and an output for controlling the amount of chilled water supplied to said first cooling coil, and a second discharge air temperature controller having a first input connected to a second temperature sensor for sensing the temperature of the air being delivered by said second fan system, a second input for establishing the temperature of the air delivered by said second fan system and an output for controlling the amount of chilled water supplied to said second cooling coil.

16. The control system of claim 15 wherein said control means comprises a chilled water temperature controller having a first input connected to a temperature sensor for sensing the temperature of the water supplied by the chiller, a second input for determining the temperature of the water and an output connected to the chiller.

17. The control system of claim 16 wherein said control means comprises a fan system control means having a high signal selector connected to said first and second volume sensing means and having an output dependent upon the higher of signals received from said first and second volume sensing means, and a fan system controller having a first input derived from said refrigerant head sensing means and a second input derived from said output of said high signal selector and having an output connected to the second inputs of said first and second discharge air temperature controllers to minimize the total transport and chiller energy usage.

18. The control system of claim 16 comprising a computer system connected to said first and second discharge air temperature controllers, to said chilled water temperature controller, to said first and second volume sensing means, to said refrigerant head sensing means, and to a flow sensor for sensing chiller supply water flow to said first and second cooling coils for controlling said first and second fans and said chiller to minimize the transport and chiller energy usage.

19. The control system of claim 12 wherein said control means comprises a first discharge air temperature controller having a first input connected to a first temperature sensor for sensing the temperature of the air being delivered by said first fan system, a second input for establishing the temperature of the air delivered by said first fan system and an output for controlling the amount of chilled water supplied to said first cooling coil, and a second discharge air temperature controller having a first input connected to a second temperature sensor for sensing the temperature of the air being delivered by said second fan system, a second input for establishing the temperature of the air delivered by said second fan system and an output for controlling the amount of chilled water supplied to said second cooling coil.

20. The control system of claim 19 wherein said control means comprises a chilled water temperature controller having a first input connected to a temperature sensor for sensing the temperature of the water supplied by the chiller, a second input for determining the temperature of the water and an output connected to the chiller.

21. The control system of claim 20 wherein said control means comprises a fan system control means having a high signal selector connected to said first and second fan energy sensing means and having an output dependent upon the higher of signals received from said first and second fan energy sensing means, and a fan system controller having a first input derived from said chiller energy sensing means and a second input derived from said output of said high signal selector and having an output connected to the inputs of said first and second discharge air temperature controllers to minimize the total transport and chiller energy usage.

22. The control system of claim 20 comprising a computer system connected to said first and second discharge air temperature controllers, to said chilled water temperature controller, to said first and second fan energy sensing means, to said chiller energy sensing means, and to a flow sensing means for sensing chiller supply water flow to said first and second cooling coils for controlling said first and second fans and said chiller to minimize the transport and chiller energy usage.

* * * * *